(12) United States Patent
Shariati

(10) Patent No.: US 11,627,546 B2
(45) Date of Patent: Apr. 11, 2023

(54) DELAYING RENDERING TIME FOR AUDIO COMPUTING SYSTEMS

(71) Applicant: SEMICONDUCTOR COMPONENTS INDUSTRIES, LLC, Phoenix, AZ (US)

(72) Inventor: Hamidreza Shariati, Waterloo (CA)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 17/249,078

(22) Filed: Feb. 19, 2021

(65) Prior Publication Data
US 2022/0070804 A1    Mar. 3, 2022

Related U.S. Application Data

(60) Provisional application No. 62/706,672, filed on Sep. 2, 2020.

(51) Int. Cl.
*H04R 3/12* (2006.01)
*H04W 56/00* (2009.01)
*H04W 76/15* (2018.01)

(52) U.S. Cl.
CPC ............ *H04W 56/005* (2013.01); *H04R 3/12* (2013.01); *H04W 76/15* (2018.02); *H04R 2420/07* (2013.01)

(58) Field of Classification Search
CPC .... H04R 3/12; H04R 2420/07; H04R 1/1041; H04R 1/1016
USPC ........................................... 381/77, 80
See application file for complete search history.

(56) References Cited

U.S. PATENT DOCUMENTS

| | | | |
|---|---|---|---|
| 8,041,051 B2* | 10/2011 | Pilati | H04L 25/14 381/26 |
| 9,712,266 B2 | 7/2017 | Linde et al. | |
| 11,259,192 B2* | 2/2022 | Hariharan | H04L 43/0847 |
| 2009/0298420 A1 | 12/2009 | Haartsen et al. | |
| 2020/0053460 A1* | 2/2020 | Pedersen | H04W 4/80 |

* cited by examiner

*Primary Examiner* — Disler Paul
(74) *Attorney, Agent, or Firm* — Brake Hughes Bellermann LLP

(57) ABSTRACT

A first audio computing system to establish a connection with an audio source within a first network, establish a connection with a second audio computing system within a second network, receive, from the audio source via the connection within the first network, a first audio packet, the first audio packet including audio data, receive, from the second audio computing system, a receipt time, the receipt time indicating when the second audio computing system received, from the audio source within the first network, a second audio packet, the second audio packet including the audio data included in the first audio packet, calculate a rendering time based on a time of receiving the first audio packet and the receipt time, send the rendering time to the second audio computing system via the second network, and output audio based on the audio data.

13 Claims, 9 Drawing Sheets

DELAYING RENDERING TIME FOR AUDIO COMPUTING SYSTEMS

PRIORITY CLAIM

This Application claims priority to U.S. Provisional App. No. 62/706,672, filed on Sep. 2, 2020, the disclosure of which is hereby incorporated by reference.

TECHNICAL FIELD

This description relates to wireless networks of audio computing systems.

BACKGROUND

An audio source can send audio data to two different audio computing systems. If the audio source sends the same audio data to the two different audio computing systems at different times, or audio data that should be played by speakers at same times in a stereo audio data system, the audio computing systems can render the same output audio at different times, which can result in a less than optimal user experience.

SUMMARY

According to an example, a non-transitory computer-readable storage medium can include instructions stored thereon. When executed by at least one processor, the instructions can be configured to cause a first audio computing system to establish a connection with an audio source within a first network, the first network including the audio source, the first audio computing system, and a second audio computing system, establish a connection with the second audio computing system within a second network, the second network including the first audio computing system and the second audio computing system, receive, from the audio source via the connection within the first network, a first audio packet, the first audio packet including audio data, receive, from the second audio computing system, a receipt time, the receipt time indicating when the second audio computing system received, from the audio source within the first network, a second audio packet, the second audio packet including the audio data included in the first audio packet, calculate a rendering time based on a time of receiving the first audio packet and the receipt time, send the rendering time to the second audio computing system via the second network, and output audio based on the audio data.

A non-transitory computer-readable storage medium can include instructions stored thereon. When executed by at least one processor, the instructions can be configured to cause a peripheral audio computing system to establish a connection with an audio source within a first network, the first network including the audio source, the peripheral audio computing system, and a central audio computing system, establish a connection with the central audio computing system within a second network, the second network including the peripheral audio computing system and the central audio computing system, the central audio computing system functioning as a central node in the second network, receive, from the audio source via the connection within the first network, an audio packet, the audio packet including audio data, send, to the central audio computing system, a receipt time, the receipt time indicating when the peripheral audio computing system received the audio packet, receive, from the central audio computing system, a rendering time, and output, at a time based on the rendering time, audio based on the audio data.

An apparatus can include at least one processor, and a non-transitory computer-readable storage medium comprising instructions stored thereon. When executed by the at least one processor, the instructions can be configured to cause a first audio computing system to establish a connection with an audio source within a first network, the first network including the audio source, the first audio computing system, and a second audio computing system establish a connection with the second audio computing system within a second network, the second network including the first audio computing system and the second audio computing system, receive, from the audio source via the connection within the first network, a first audio packet, the first audio packet including audio data, receive, from the second audio computing system, a receipt time, the receipt time indicating when the second audio computing system received, from the audio source within the first network, a second audio packet, the second audio packet including the audio data included in the first audio packet, calculate a rendering time based on a time of receiving the first audio packet and the receipt time, send the rendering time to the second audio computing system via the second network, and output audio based on the audio data.

The details of one or more implementations are set forth in the accompanying drawings and the description below. Other features will be apparent from the description and drawings, and from the claims.

BRIEF DESCRIPTION OF THE DRAWINGS

Like reference numbers refer to like elements.

DETAILED DESCRIPTION

Figure 1A:
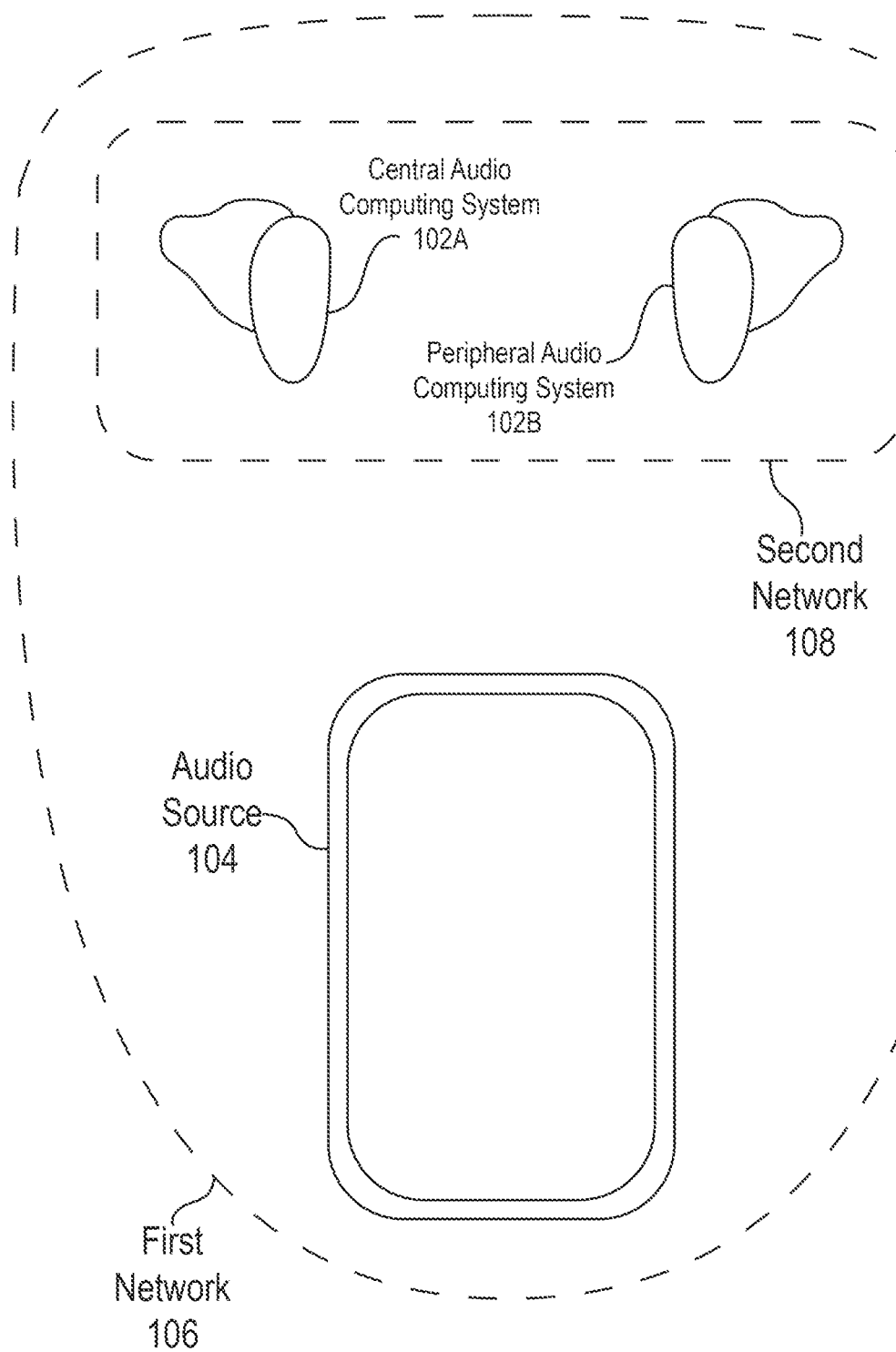
FIG. 1A is a network diagram showing a central audio computing system, a peripheral audio computing system, and an audio source.

An audio source can provide audio data to audio computing systems via first a wireless network, such as a frequency hopping network, in the form of audio packets. The audio source can send different audio packets, that have the same audio data and same sequence numbers to identify the packets as having same audio data, or different audio data to be played from different speakers at the same time with same sequence numbers to indicate that they are to be rendered and/or outputted at the same time, to different audio computing systems, at different times, causing the audio computing systems to receive the same audio data at different times. If the audio computing systems render and output the audio data independently in response to receiving the audio packets from the audio source, the audio computing systems can render the same audio output at different times, creating a less than optimal experience for the user. In an example of hearing aids, a lack of synchronization between the audio computing systems can result in a frustrating experience for the user.

To enable the audio computing systems to render the same audio output at the same time, a wireless audio streaming protocol is described herein in which one of the audio computing systems, which can be considered a first or central audio computing system, can establish a second, separate wireless network, which can be a frequency hopping network, that includes only the central audio computing system and the other audio computing system(s), which can be considered a second or peripheral audio computing system(s). The central audio computing system can extract the timing of the central and peripheral audio computing systems to determine a delay between the central audio computing system and the peripheral audio computing system(s) receiving their respective audio packets from the audio source. Based on the determined delay, the central audio computing system can determine delayed rendering times for the audio computing systems to render and output the audio data after the audio data was received and stored/buffered, so that the audio computing systems are synchronized and/or output the same audio data at the same time. In some examples, the central audio computing system can establish the separate wireless network before the audio source starts streaming audio packets. In some examples, the central audio computing system can establish the separate wireless network for only a short period of time and determine and send the rendering time during the short period of time before ending and/or disconnecting the separate wireless network. As long as the first wireless network established by the audio source is not disconnected and/or the link parameters within the first wireless network are not changed and/or remain the same, the synchronization of outputting audio by the central and peripheral audio computing systems can be maintained without reestablishing the second wireless network between the central and peripheral audio computing systems.

FIG. 1A is a network diagram showing a central audio computing system 102A, a peripheral audio computing system 102B, and an audio source 104. The audio source 104 can be a computing system that serves (e.g., functions) as a source of audio data and establishes a first network 106 for transmitting the audio data to the central audio computing system 102A and the peripheral audio computing system 102B. The audio source 104 can include a computing system with a wireless networking interface, such as, for example, a smartphone, a tablet computing device, a laptop computing device, or a desktop computing device. The audio computing systems 102A, 102B can include network devices that output audio, such as hearing aids, ear buds, headphones, a paired speaker system, and so forth. The audio source 104 can output, and/or send to the audio computing systems 102A, 102B, audio data that the audio source 104 has stored in long-term and/or non-volatile memory on the audio source 104, and/or audio data that the audio source 104 receives and/or streams from another computing system.

The audio computing systems 102A, 102B can include free running timers, such as crystal (XTAL) timers and/or crystal oscillators.

The audio source 104 can establish a first wireless network 106, such as a piconet in a Bluetooth Low Energy (BLE) implementation of a frequency hopping network. The audio source 104 can be a central node, which can also be considered a master device, that establishes the first network 106 and/or connections with the other computing devices 102A, 102B within the first network 106, and schedules transmissions of packets by the audio source 104 and the audio computing devices 102A, 102B within the first network 106. The audio computing devices 102A, 102B can be peripheral nodes, which can also be considered slave devices, within the first network 106.

A central audio computing system 102A, which can also be considered a first audio computing system, can establish a second wireless network 108, such as a BLE implementation of a frequency hopping network. The central audio computing system 102A can be a central node, which can also be considered a master device, that establishes the second network 108 and/or connection with the peripheral audio computing system 102B within the second network 106, and schedules transmissions of packets by the central audio computing system 102A and the peripheral audio computing system 102B within the second network 108. The peripheral audio computing system 102B can be a peripheral node, which can also be considered a slave device, within the second network 108.

Figure 1B:
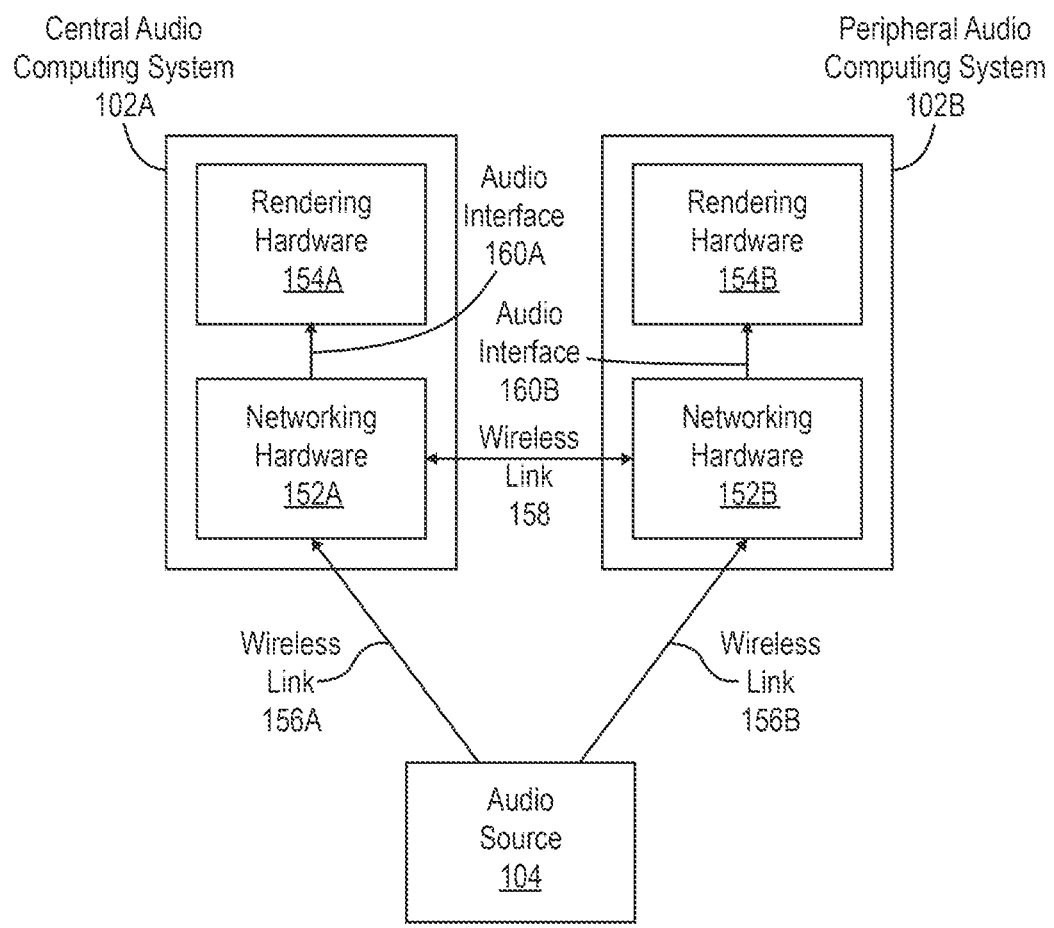
FIG. 1B is a block diagram showing the central audio computing system, the peripheral audio computing system, and the audio source.

FIG. 1B is a block diagram showing the central audio computing system 102A, the peripheral audio computing system 102B, and the audio source 104. As shown in FIG. 1B, the audio computing systems 102A, 102B include networking hardware 152A, 152B for communicating with each other and the audio source 104, and rendering hardware 154A, 154B for rendering and outputting audio data received from the audio source 104. The networking hardware 152A, 152B can communicate with the audio source 104 via a wireless link 156A, 156B established by the audio source 104 within the first network 106. The networking hardware 152A, 152B can communicate with the other audio computing system 102A, 102B via a wireless link 158 established by the central audio computing system 102A within the first network 106. The networking hardware 152A, 152B can send audio packets to the rendering hardware 154A, 154B via audio interfaces 160A, 160B within the respective audio computing systems 102A, 102B.

Figure 2:
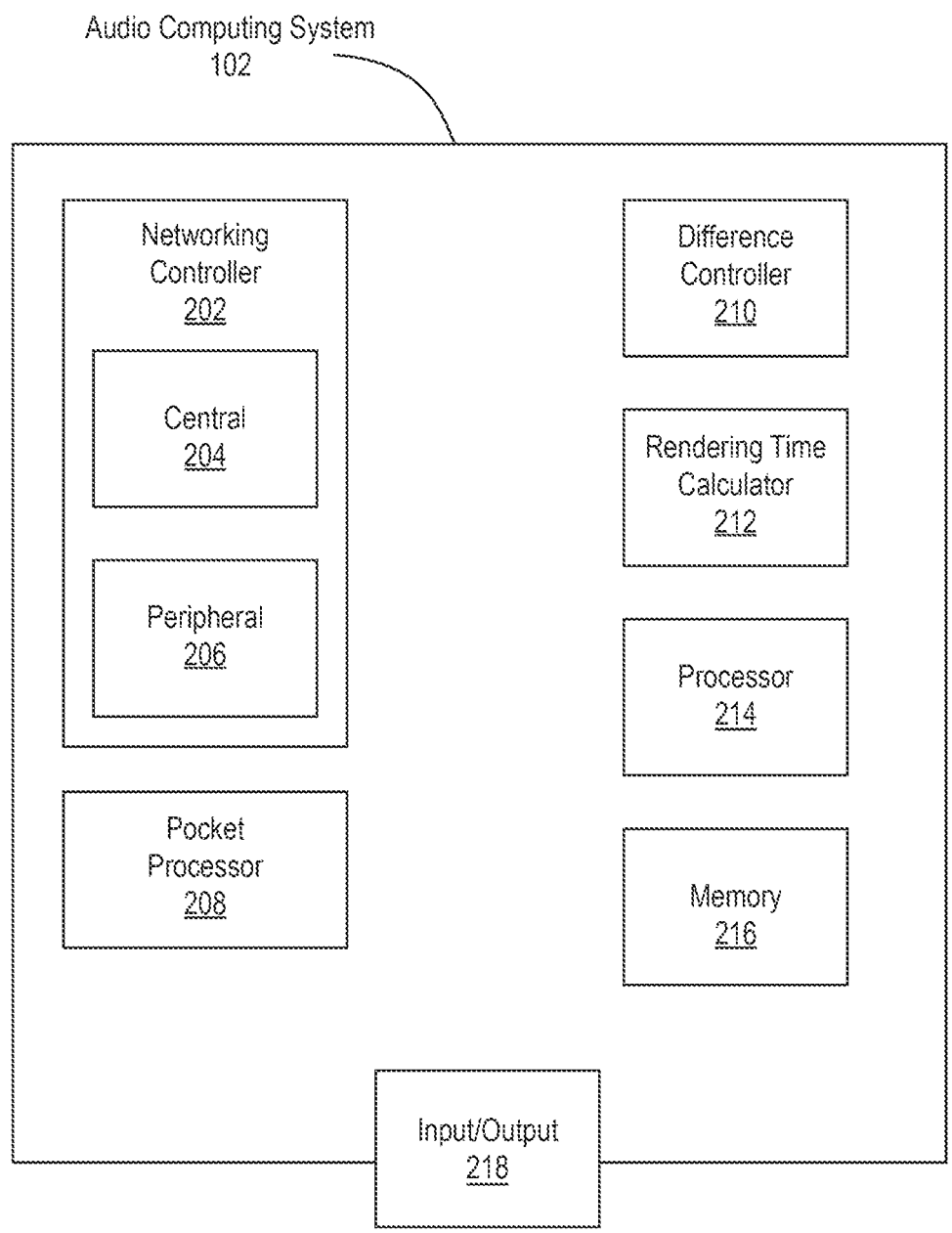
FIG. 2 is a block diagram showing an audio computing system.

FIG. 2 is a block diagram showing an audio computing system 102. The audio computing system 102 can represent either of the audio computing systems 102A, 102B. Either of the computing systems 102A, 102B can perform the role of the central node, and either of the computing systems 102A, 102B can perform the role of the peripheral node.

The audio computing system 102 can include a networking controller 202. The networking controller 202 can control establishment of, and/or communication within, the networks 106, 108. The networking controller 202 can control generating and sending packets within a network 106, 108, and/or can control receiving and processing packets within a network 106, 108. The networking controller 202 can control the networking hardware 152A, 152B shown in FIG. 1B.

A central networking controller 204 included in the networking controller 202 can control networking and/or communication activities by the audio computing system 102 when the audio computing system 102 is serving as the central node and/or master device. The central networking controller 204 can, for example, establish the second network 108 and determine times at which the central audio computing system 102A and peripheral audio computing system 102B will send packets to each other, and/or connection intervals (shown in FIG. 4B) between the central audio computing system 102A and peripheral audio computing system 102B sending packets to each other.

Figure 4A:
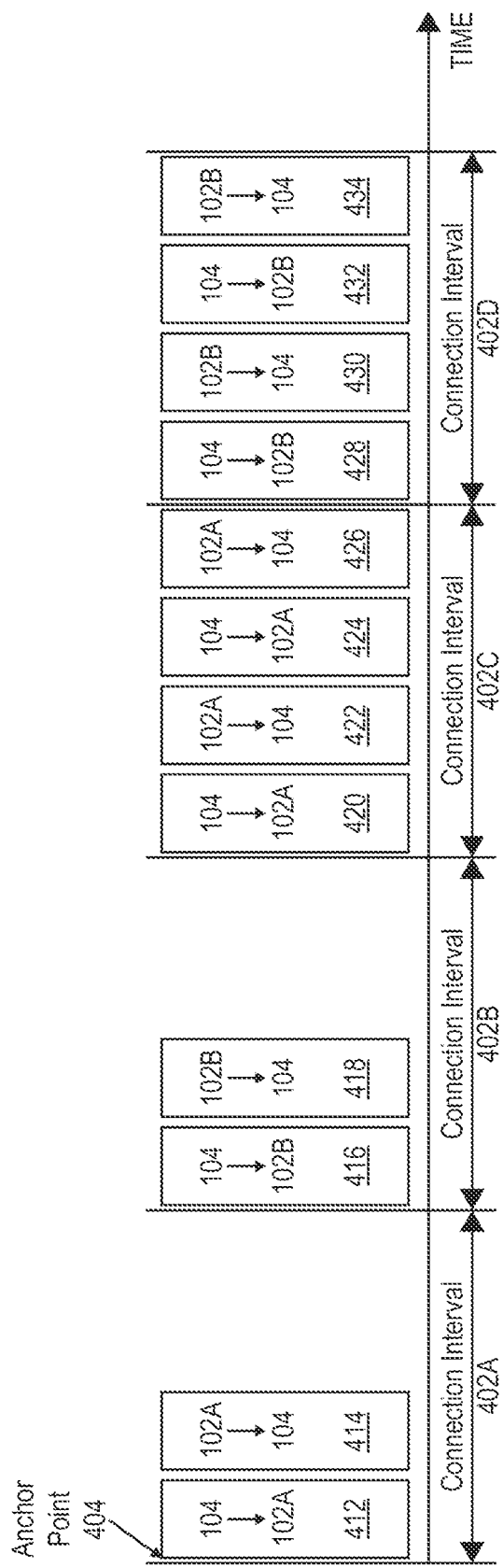
FIG. 4A is a timing diagram showing packets exchanged between the audio source and the audio computing systems.
Figure 4B:
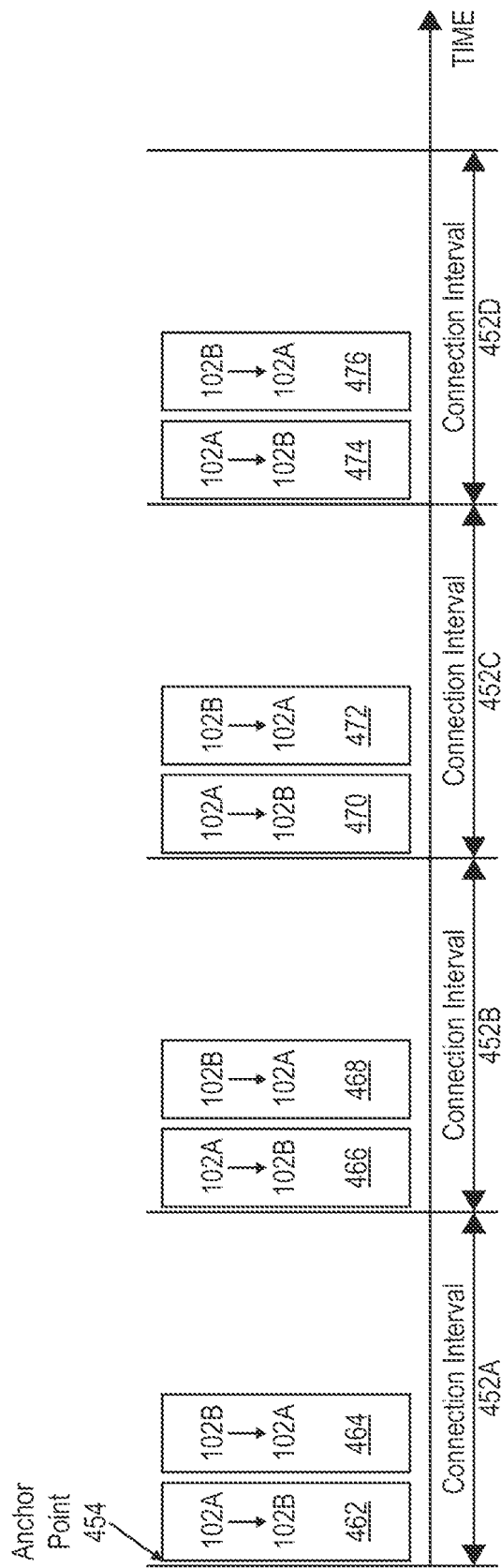
FIG. 4B is a timing diagram showing packets exchanged between the central audio computing system and the peripheral computing system.
Figure 5:
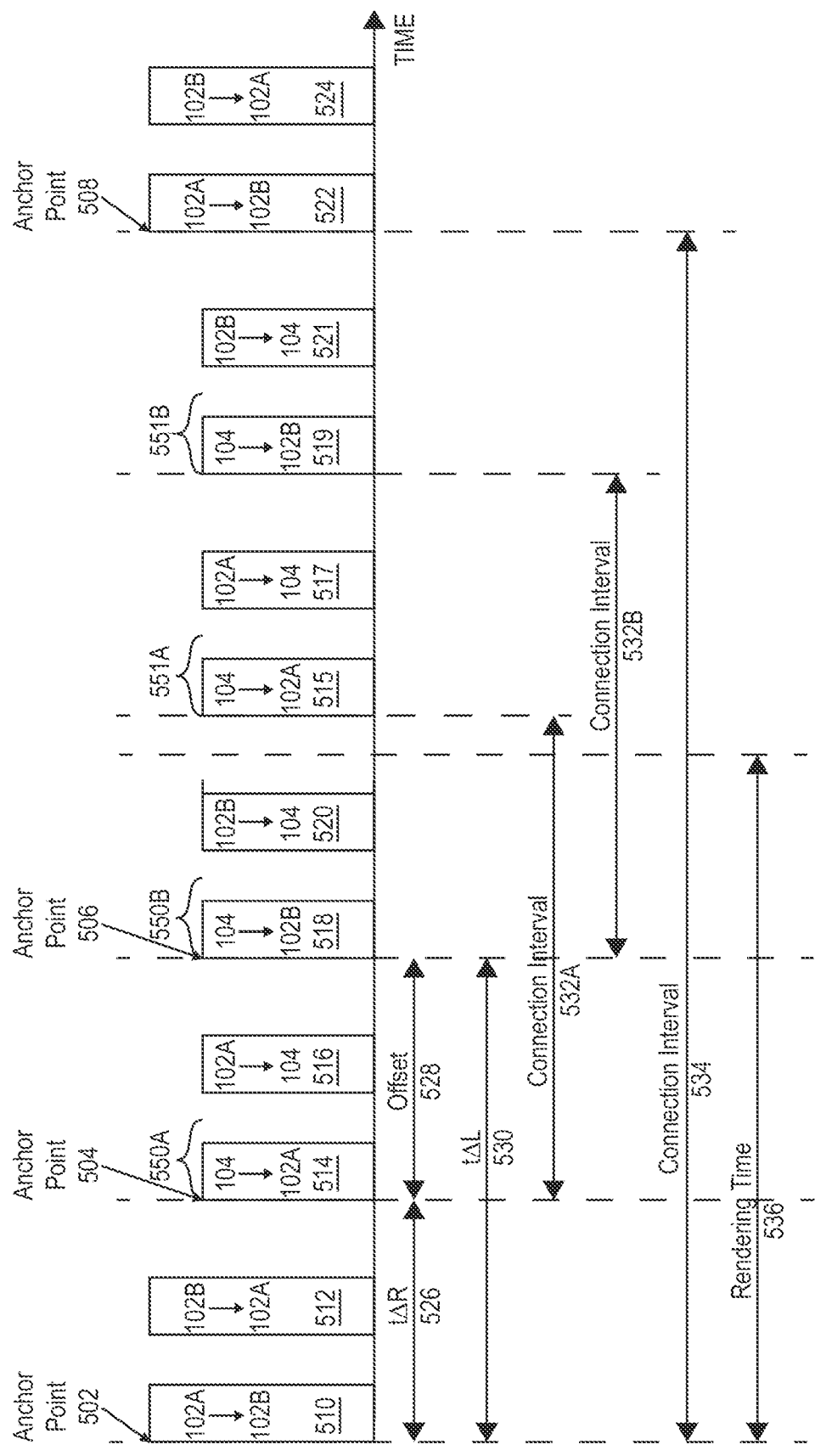
FIG. 5 is a timing diagram showing time differences between packets.

In some examples, the central networking controller 204 can determine and/or change a connection interval time of the second network 108. The connection interval, examples of which are shown in FIGS. 4A, 4B, and 5, can be times between data transfer events. A data transfer event can include one or more pairs of packets being transferred from and to the central node. The central networking controller 204 can change the connection interval time to a multiple of a connection interval of the first network 106.

The peripheral networking controller 206 included in the networking controller 202 can control networking and/or communication activities by the audio computing system 102 when the audio computing system 102 is serving as the peripheral node and/or slave device. The peripheral networking controller 206 can schedule processing received packets and sending packets based on a schedule received from a central node.

The peripheral networking controller 206 can determine anchor points. Anchor points, examples of which are shown in FIGS. 4A, 4B, and 5, can be can be beginnings of connection intervals and/or slot boundaries that define a period when a device acting as a peripheral node and/or slave device within a network 106, 108 will listen for a transmission from the central node and/or master device within the network 106, 108.

The networking controller 202 can determine one or more receipt times. The one or more receipt times can indicate when the audio computing system 102 receives audio packets from the audio source 104. The audio packets can include audio data. When the audio computing system 102 is serving as the peripheral audio computing system 102B, the audio computing system 102 can send the receipt time to the central audio computing system 102A. The central audio computing system 102A can determine rendering times based on the receipt times, and the audio computing systems 102A, 102B can render the audio data based on the determined rendering times so that the audio is outputted by both of the audio computing systems 102A, 102B at the same time.

The networking controller 202 can also capture and/or determine connection interval numbers of audio packets received from the audio source 104. Connection interval numbers can be included in packets, or the networking controller 202 can determine the connection interval number based on a time since a first connection interval divided by a connection interval time. The central audio computing system 102A can use the connection interval number to determine a delay between packets with same audio data and/or to determine rendering times.

The audio computing system 102 can include a packet processor 208. The packet processor 208 can process packets, such as audio packets, and/or render the audio packets, so that the rendering hardware 154A, 154B can output the audio data based on the audio packets.

The audio computing system 102 can include a difference calculator 210. The audio computing system 102 can launch the difference calculator 210 when the audio computing system 102 is serving as the central audio computing system 102A. In some examples, the difference calculator 210 can calculate a difference between anchor points of the central audio computing system 102A and the peripheral audio computing system 102B in the first network 106. In some examples, the difference calculator 102A can calculate the difference as a difference in connection interval numbers of the central audio computing system 102A and the peripheral audio computing system 102B receiving a same audio packet from the audio source 104 within the first network 106. In some examples, the difference calculator 210 can calculate the time difference between the central audio computing system 102A and the peripheral audio computing system 102B receiving same audio data from the audio source 104 within the first network 106 based on the following equation:

$$tDiff = tR1 = tL1 + ((N-M)*\text{connection\_interval})$$

where:

tDiff is the time difference between the central audio computing system 102A and the peripheral audio computing system 102B receiving same audio data (which the central audio computing system 102A can identify as same audio data by being included in packets with same sequence numbers) from the audio source 104 within the first network 106, tR1 is the anchor point time for the peripheral audio computing system 102B within the first network 106, tL1 is the anchor point time for the central audio computing system 102A within the first network 106, N is the connection interval number of the central audio computing system 102A for the packet with the audio data received by the central audio computing system 102A from the peripheral audio computing system 102B within the second network 108, M is the connection interval number of the peripheral audio computing system 102B for the packet with the audio data received by the peripheral audio computing system 102B from the central audio computing system 102A within the second network 108, and connection_interval is the connection interval time within the first network 106.

The audio computing system 102 can include a rendering time calculator 212. The central audio computing system 102A can launch and/or execute the rendering time calculator 212. The rendering time calculator 212 can calculate rendering times for the central and peripheral audio computing systems 102A, 102B to render the audio output based on the audio data included in the audio packets that the central and peripheral audio computing systems 102A, 102B received from the audio source 104. In some examples, the rendering time can be a delay between receiving the audio packet and rendering the audio data and/or outputting the audio based on the audio data. In some examples, the rendering time can be an absolute time that is determined by the rendering time calculator 212 based on the time difference calculated by the difference calculator 212. In some examples, the rendering times for the central and audio computing systems 102A, 102B can be offset by, and/or have a difference of, the difference calculated by the difference calculator 210. In some examples, the rendering time calculator 212 can calculate the rendering times for the central audio computing system 102A and the peripheral audio computing system 102B based on the following two equations:

$$\text{central\_rendering\_time} = tL2 + Dly, \text{ and}$$

$$\text{peripheral\_rendering\_time} = tL2 + tDiff + Dly,$$

where:

central_rendering_time is the time by which the central audio computing system 102A will render the audio data and/or output the audio, peripheral_rendering_time is the time by which the peripheral audio computing system 102B will render the audio data and/or output the audio, tL2 is a time captured by the central audio computing system 102A after receiving the anchor point time tR1 from the peripheral audio computing system, the connection interval number M, and/or the a sequence number of the packet with the audio data from the peripheral audio computing system, Dly is a predetermined delay time interval, and tDiff is the time interval calculated by the difference calculator 210.

The audio computing system 102 can include at least one processor 214. The at least one processor 214 can execute instructions, such as instructions stored in at least one memory device 216, to cause the audio computing system 102 to perform any combination of methods, functions, and/or techniques described herein.

The audio computing system 102 can include at least one memory device 216. The at least one memory device 216 can include a non-transitory computer-readable storage medium. The at least one memory device 216 can store data and instructions thereon that, when executed by at least one processor, such as the processor 214, are configured to cause the audio computing system 102 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the audio computing system 102 can be configured to perform, alone, or in combination with the audio computing system 102, any combination of methods, functions, and/or techniques described herein.

The audio computing system 102 can include at least one input/output node 218. The at least one input/output node 218 can include networking hardware 152A, 152B that receives and/or sends data, such as from and/or to, the audio computing systems 102A, 102B and the audio source 104, and/or may receive input and provide output from and to a user. The at least one input/output node 218 can include rendering hardware 154A, 154B and/or speakers for outputting audio. The input and output functions may be combined into a single node, or may be divided into separate input and output nodes.

Figure 3:
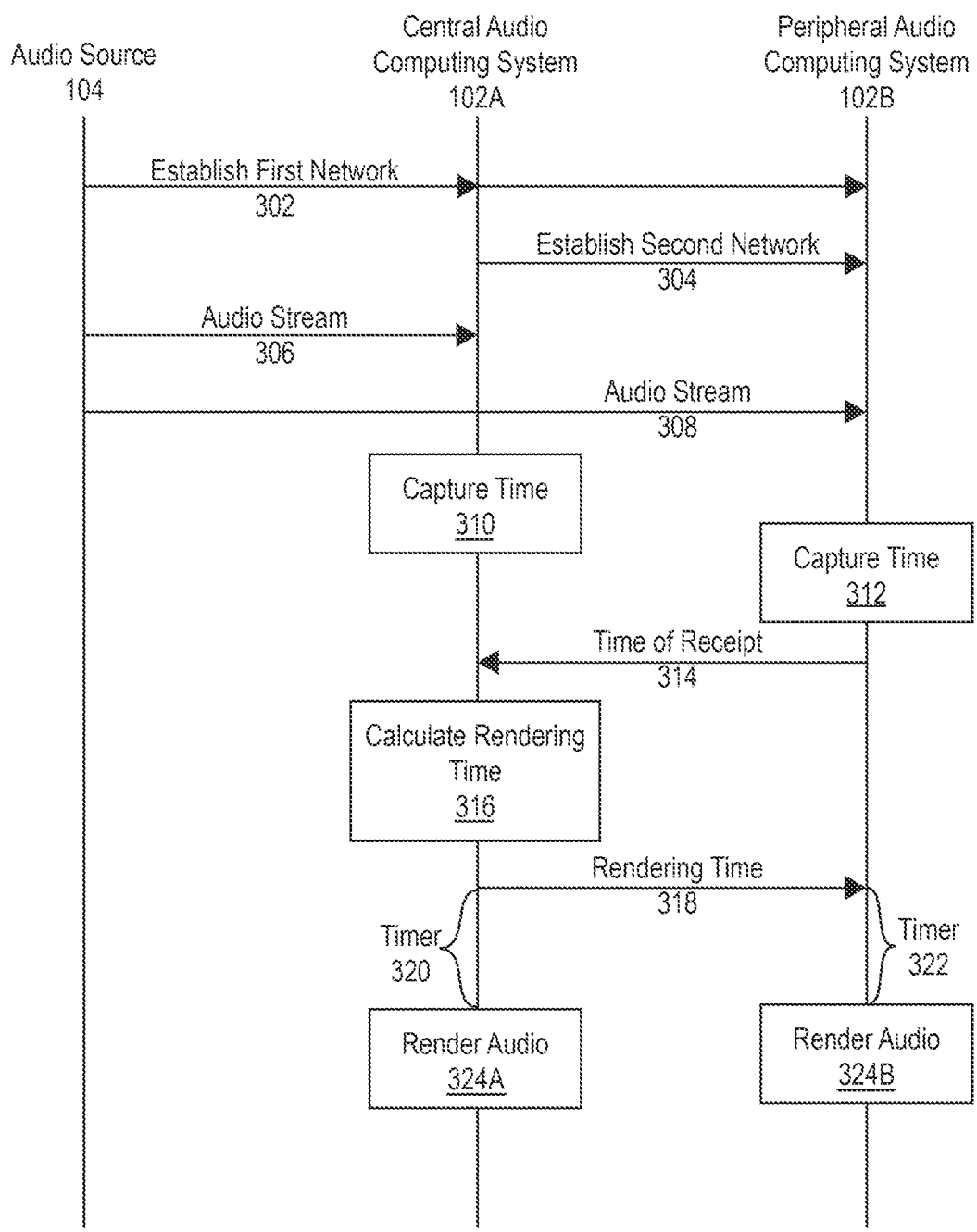
FIG. 3 is a timing diagram showing communications between, and actions performed by, the central audio computing system, the peripheral audio computing system, and an audio source.

FIG. 3 is a timing diagram (and/or message sequence chart) showing communications between, and actions performed by, the central audio computing system 102A, the peripheral audio computing system 102B, and the audio source 104. The audio source 104 can establish the first network 106 (302). The audio source 104 can establish the first network 106 by pairing with the central audio computing system 102A and pairing with the peripheral audio computing system 102B. The audio source 104 can pair with each of the audio computing systems 102A, 102B by sending messages including random numbers to the audio computing devices 102A, 102B, to which the audio computing devices 102A, 102B will respond by sending acceptance messages, and with which the audio source 104 and audio computing systems 102A, 102B will generate initialization messages. The audio source 104 can exchange subsequent messages with each of the audio computing systems 102A, 102B to generate link keys for mutual authentication.

After the audio source 104 has established the first network 106 (302), one of the audio computing systems 102A, 102B can serve as the central audio computing system 102A and establish the second network 108 (304). The central audio computing system 102A can establish the second network 108 (304) by a similar procedure that the audio source 104 established the first network 106 (302). The second network 108 can include only the central audio computing system 102A and peripheral audio computing system 102B, and/or not include the audio source 104. The peripheral audio computing system 102B can be considered a client of the second wireless network 108 and/or link.

After establishing the first network 106 (302), the audio source 104 can stream audio (306, 308) to the audio computing systems 102A, 102B. The audio streams (306, 308) can include audio packets sent from the audio source 104 to the audio computing systems 102A, 102B. In some examples, audio packets sent to the central audio computing system 102A can include the same audio data as the audio packets sent to the peripheral audio computing system 102B. Packets sent to the central audio computing system 102A with sequence numbers that match sequence numbers of packets sent to the peripheral audio computing system 102B can include the same audio data. In some examples of stereo audio systems, audio packets sent to the central audio computing system 102A can include different audio data as the audio packets sent to the peripheral audio computing system 102B, but that should be played at the same time. Sequence numbers included in the audio packets can identify audio packets that should be played at the same time, with an audio packet received by the central audio computing system 102A that has a particular sequence number being outputted and/or rendered at the same time as an audio packet received by the peripheral audio computing system 102B that has the same particular sequence number. The audio computing systems 102A, 102B can store and/or buffer the audio packets included in the audio streams (306, 308) and the sequence numbers included in the audio packets.

After receiving the audio stream (306, 308), and/or after receiving first packets within the respective audio stream (306, 308), the audio computing systems 102A, 102B can capture times (310, 312) of receiving the respective packets, and/or capture anchor points tL1 (for the central audio computing system 102A) and tR1 (for the peripheral audio computing system 102B). In some examples, the audio computing systems 102A, 102B can capture times (310, 312) maintained by their respective free running timers. In some examples, the peripheral computing device 102B can capture the time (312) at the beginning of the packet within the audio stream (308). In some examples, the central audio computing system 102A can capture the time (310) maintained by the free running timer included in the central audio computing system 102A when the central audio computing system 102A begins sending a packet to the peripheral audio computing system 102B. The audio computing systems 102A, 102B can also capture the connection event counter numbers within the second network 108, N for the central audio computing system 102A and M for the peripheral audio computing system 102B. After capturing the time (312), anchor point tR1, and/or connection event counter number M, the peripheral audio computing system 102B can send the time of receiving the packet, anchor point tR1, and/or connection event counter number M to the central audio computing system 102B.

The connection event counter numbers can be incremented every connection interval, and can indicate the connection event number and/or connection interval number. In the example shown in FIG. 4A, the connection interval 402A can have a connection event counter number of one (1), the connection interval 402B can have a connection event counter number of two (2), the connection interval 402C can have a connection event counter number of three (3), and the connection interval 402D can have a connection event counter number of four (4). In the example shown in FIG. 4B, the connection interval 452A can have a connection event counter number of one (1), the connection interval 452B can have a connection event counter number of two (2), the connection interval 452C can have a connection event counter number of three (3), and the connection interval 452D can have a connection event counter number of four (4).

After receiving, from the peripheral audio computing system 102B, the time of receiving the packet, anchor point tR1, and/or connection event counter number M, the central audio computing system 102A can calculate the rendering time(s) central_rendering_time, peripheral_rendering_time (316). The central audio computing system 102A can calculate the rendering time(s) central_rendering_time, peripheral_rendering_time (316) as discussed above with respect to the rendering time calculator 212.

After calculating the rendering time (316), the central audio computing system 102A can send the rendering time 318, peripheral_rendering_time, to the peripheral audio computing system 102B. Sending the rendering time 318 can include the central audio computing system 102A sending an instruction to the peripheral audio computing system to render audio data, identified by a specific sequence number, at a specific time. The central audio computing system 102A may have calculated the specific time as the rendering time based on the time offset between the audio computing systems 102A, 102B and/or based on the tDiff. When sending the rendering time (318) to the peripheral audio computing system 102B, the central audio computing system 102A can also send, and/or include with the rendering time (318), a minimum value of an oldest sequence numbers of audio packets that the central audio computing system 102A has received from the audio source 104, and/or a sequence number of an packet that the central audio computing system 102A has received from, and/or been notified by, the peripheral audio computing system 102B.

The audio computing systems 102A, 102B can wait for timers 320, 322 to expire based on the determined respective rendering times central_rendering_time, peripheral_rendering_time, and/or reach predetermined times based on the determined respective rendering times central_rendering_time, peripheral_rendering_time. The timers maintained by each of the audio computing systems 102A, 102B can have different rendering delays that are equal to the respective rendering times determined by the central audio computing system 102A minus a current time. Once the timers 320, 322 have expired and/or reached predetermined times based on the determined respective rendering times central_rendering_time, peripheral_rendering_time, the audio computing systems 102A, 102B can decode and/or render the audio 324A, 324B at same times, and/or output the same audio at the same time (or different audio with matching sequence numbers at the same time). Different rendering times central_rendering_time, peripheral_rendering_time and/or timers 320, 322 for the audio computing systems 102A, 102B make up for different times of receiving audio packets within the audio streams 306, 308, so that the audio computing systems 102A, 102B output same audio at the same time, since both audio computing systems 102A, 102B use a same processing clock. The different packets with same audio data received by the central audio computing system 102A and the peripheral audio computing system 102B, and/or different packets with different audio data that are to be outputted and/or rendered at the same time in a stereo audio system, may have had same sequence numbers, identifying the packets as including same audio data and/or that the audio data included in the audio packets is to be played at the same time. FIG. 4A is a timing diagram showing packets exchanged between the audio source 104 and the audio computing systems 102A, 102B. The packets shown in FIG. 4A are exchanged within the first network 106. The timeline is divided into connection intervals 402A, 402B, 402C, 402D. Connection intervals 402A, 402B, 402C, 402D can represent time between data transfer events, connection events, and/or communication events, and/or can represent fixed intervals between sending audio packets. During each connection interval, the audio source 104, serving as the central node and/or master device within the first network 106, can alternate sending packets to and from only one of the audio computing systems 102A, 102B, with the audio source 104 sending the first packet within each connection interval 402A, 402B, 402C, 402D.

For example, during a first connection interval 402A, the audio source 104 sends a packet 412 to the central audio computing system 102A and the central audio computing system 102A can send a packet 414 to the audio source 104. During a second connection interval 402B, the audio source 104 can send a packet 416 to the peripheral audio computing system 102B, and the peripheral audio computing system 102B can send a packet 418 to the audio source 104. During a third connection interval 402C, the audio source 104 can send a first packet 420 to the central audio computing system 102A, the central audio computing system 102A can send a first packet 422 to the audio source 104, the audio source 104 can send a second packet 424 to the central audio computing system 102B, and the central audio computing system 102B can send a second packet 426 to the audio source 104. During a fourth connection interval 402D, the audio source 104 can send a first packet 428 to the peripheral audio computing source 102B, the peripheral audio computing source 102B can send a first packet 430 to the audio source 104, the audio source 104 can send a second packet 432 to the peripheral audio computing source 102B, and the peripheral audio computing source 102B can send a second packet 434 to the audio source 104.

FIG. 4A shows an anchor point 404 when a beginning of a packet 412 is received by the central audio computing system 102A from the audio source 104. The anchor point 404 can be a slot boundary at a beginning of the connection interval 402A that determines when the peripheral audio computing system 102A, acting as the peripheral node and/or slave device within the first network 106, begins listening for a transmission from the audio source 104, which is acting as the central node and/or master device within the first network 106.

FIG. 4B is a timing diagram showing packets exchanged between the central audio computing system 102A and the peripheral computing system 102B. The packets shown in FIG. 4B are exchanged within the second network 106. The timeline is divided into connection intervals 452A, 452B, 452C, 452D, which have similar features to the connection intervals 402A, 402B, 402C, 402D shown and described with respect to FIG. 4A.

Within each connection interval 452A, 452B, 452C, 452D, the central audio computing system 102A and the peripheral computing system 102B can alternate sending and receiving packets, with the central audio computing system 102A, serving as the central node and/or master device, sending the first packet within each connection interval 452A, 452B, 452C, 452D. For example, during a first connection interval 452A, the central audio computing system 102A sends a packet 462 to the peripheral audio computing system 102B, and then the peripheral audio computing system 102B sends a packet 464 to the central audio computing system 102A. During a second connection interval 452B, the central audio computing system 102A sends a packet 466 to the peripheral audio computing system 102B, and then the peripheral audio computing system 102B sends a packet 468 to the central audio computing system 102A. During a third connection interval 452C, the central audio computing system 102A sends a packet 470 to the peripheral audio computing system 102B, and then the peripheral audio computing system 102B sends a packet 472 to the central audio computing system 102A. During a fourth connection interval 452D, the central audio computing system 102A sends a packet 474 to the peripheral audio computing system 102B, and then the peripheral audio computing system 102B sends a packet 476 to the central audio computing system 102A.

FIG. 4B shows an anchor point 454 at a beginning of a packet 462 received by the peripheral audio computing system 102B from the central audio computing system 102A. The anchor point 454 can have similar features for the peripheral audio computing system 102B within the second network 108 as the anchor point 404 has for the central audio computing system 102B within the first network 106.

FIG. 5 is a timing diagram showing time differences between packets. A connection interval 534 within the second network 108 can be a multiple of, such as an integer multiple of, a connection interval 532A, 532B within the first network 106 (FIG. 5 I not necessarily drawn to scale). The greater connection interval 534 within the second network 108 than the connection interval 532A, 532B within the first network 106 can ensure that, after the central audio computing system 102A and peripheral audio computing system 102B exchange packets 510, 512 within the second network 108, the next packet 514 sent will be a packet sent by the audio source 104 within the first network 106.

The peripheral audio computing system 102B can capture and/or store a first anchor point 502 within the second network 108. One connection interval 534 (within the second network 108) after the first anchor point 502, the peripheral audio computing system 102B can capture and/or store a second anchor point 508 within the second network 108. The central audio computing system 102A can capture and/or store an anchor point 504 within the first network 106. The peripheral audio computing system 102B can capture and/or store an anchor point 506 within the first network 106.

The tΔR 526 can be a time difference between the central audio computing device 102A sending a packet 510 in the second network 108 (t0) and the audio source 104 sending, and/or the central computing device 102A receiving, a packet 514 within the first network 106 (t1). The tΔL 530 can be a time difference between the central audio computing system 102A sending the packet 510 in the second network 108 (t0) and the audio source 104 sending, and/or the peripheral audio computing system 102A receiving, a packet 518 (t2). A rendering time 536 can be a same time t3, and/or a time difference from t0 and t3, at which the central audio computing system 102A and the peripheral audio computing system 102B output same audio, and/or different audio that are to be played at same times in a stereo audio system (which may have same sequence numbers).

The time difference, delay, and/or offset between audio packets sent by the audio source 104 to the central audio computing system 102A and audio packets sent by the audio source 104 to the peripheral audio computing system 102B, can remain constant as long as the audio source 104 does not change connection parameters between the audio source 104 and the audio computing systems 102A, 102B within the first network 106. When the time difference remains constant, the central audio computing system 102A can change and/or set the connection interval 534 of the second wireless network 108 to be an integer multiple, greater than one, of the connection interval 532A, 532B of the first wireless network 106. After the central audio computing system 102A determines the time difference tDiff, and/or the rendering times central_rendering_time, peripheral_rendering_time, and/or sends the time difference tDiff and or peripheral_rendering_time to the peripheral audio computing system, the central audio computing system 102A can disconnect and/or end the second network 108. The audio computing system 102A, 102B can capture beginnings of packets sent and/or received within the second wireless network 108, which can be the anchor point 502, as well as times of receiving next audio packets from the audio source 104 within the first wireless network 106 and/or times of receiving immediately succeeding audio packets within the first wireless network 106. If either of the audio computing systems 102A, 102B does not receive the next audio packet within the first network 106 because of an overlap and/or collision with the second network 108 or channel quality, then the audio computing system 102A, 102B that did not receive the next audio packet can wait to receive another packet within the second network 108 and can calculate a time difference between that (another) packet within the second network 108 and the next packet received by the respective audio computing system 102A, 102B within the first network 106. The respective audio computing systems 102A, 102B can calculate tΔL and tΔR based on the differences between the packets received within the second network 108 and the next packets received within the first network 106. The timers 550A, 550B (similar to timers 320, 322) can be started from the anchor points 504, 506 within the first network 106 based on the known anchor point 502 within the second network 108. Timers 551A, 551B, which are similar to the timers 550A, 550B, can also start from anchor points within the first network 106 that are not labeled in FIG. 5. After the timers 550A, 550B have expired and/or reached predetermined times based on the determined respective rendering times central_rendering_time, peripheral_rendering_time, the audio computing systems 102A, 102B can decode and/or render audio at same times, and/or output the same audio at the same time (or different audio with matching sequence numbers at the same time). After the time offsets tΔL and tΔR have been calculated, the central audio computing system 102A can end and/or disconnect the second network 108 to reduce and/or save power consumption. For subsequent audio streams (306, 308), the audio computing systems 102A, 102B can synchronize their audio data by running timers 550A, 550B after anchor points 504, 506 within the first network 106 based on the time differences determined within the second network 108. Synchronizing the rendering audio data (324A, 324B) based on the anchor points 504, 506 within the first network 106 eliminates the need for clock accuracy in the audio computing systems 102A, 102B.

Figure 6:
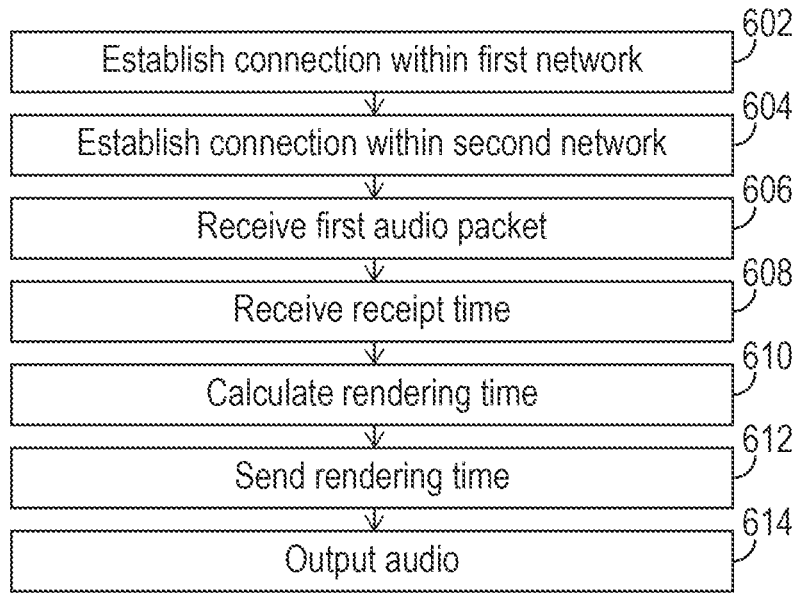
FIG. 6 is a flowchart showing a method performed by the central audio computing system.

FIG. 6 is a flowchart showing a method performed by the central audio computing system. The method can include establishing a connection with an audio source within a first network, the first network including the audio source, the first audio computing system, and a second audio computing system (602). The method can include establishing a connection with the second audio computing system within a second network, the second network including the first audio computing system and the second audio computing system (604). The method can include receiving, from the audio source via the connection within the first network, a first audio packet, the first audio packet including audio data (606). The method can include receiving, from the second audio computing system, a receipt time, the receipt time indicating when the second audio computing system received, from the audio source within the first network, a second audio packet, the second audio packet including the audio data included in the first audio packet (608). The method can include calculating a rendering time based on a time of receiving the first audio packet and the receipt time (610). The method can include sending the rendering time to the second audio computing system via the second network. The method can include outputting audio based on the audio data.

In some examples, the second network does not include the audio source.

In some examples, the method further includes capturing a first connection interval number of the first audio packet, the receiving the receipt time includes receiving the receipt time and a second connection interval number of the second packet, and the calculating the rendering time comprises calculating the rendering time based on the time of receiving the first audio packet, the receipt time, the first connection interval number, the second connection interval number, and a connection interval time.

In some examples, the first audio packet includes the audio data and a sequence number identifying the audio data, and the receiving the receipt time comprises receiving, from the second audio computing system, the receipt time and the sequence number.

In some examples, the rendering time comprises a second audio computing system rendering time, the method further includes calculating a first audio computing system rendering time based on the time of receiving the first audio packet, and the outputting audio based on the audio data comprises outputting the audio based on the audio data at the first audio computing system rendering time.

In some examples, the audio source is a central node of the first network.

In some examples, the first audio computing system is a central node of the second network.

In some examples, the first audio computing system is a central node of the second network.

In some examples, the method further includes establishing a connection interval of the second network to a multiple of a connection interval of the first network.

In some examples, the method further includes recalculating the rendering time based on a difference between an anchor point of the second audio node in the second network and an anchor point of the second audio node in the first network.

In some examples, the rendering time comprises a second audio computing system rendering time, the method further includes calculating a first audio computing system rendering time based on the time of receiving the first audio packet, the outputting audio based on the audio data comprises outputting the audio based on the audio data at the first audio computing system rendering time. In some examples, the method further includes changing a connection interval of the second network to a multiple of a connection interval of the first network, recalculating the first rendering time based on a difference between an anchor point of the first audio node in the second network and an anchor point of the first audio node in the first network, and recalculating the second rendering time based on a difference between an anchor point of the second audio node in the second network and an anchor point of the second audio computing system in the first network.

In some examples, the method further includes sending the recalculated second rendering time to the second audio computing system.

In some examples, the method further includes ending the second network after sending the recalculated second rendering time to the second audio computing system.

Figure 7:
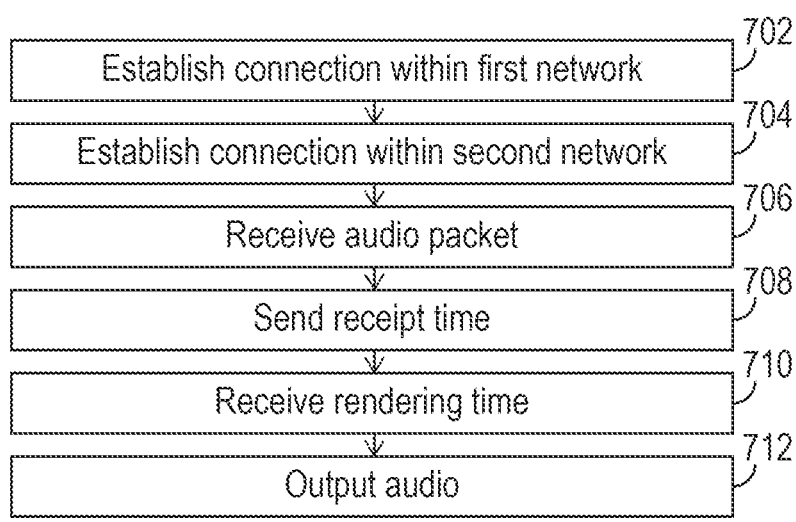
FIG. 7 is a flowchart showing a method performed by the peripheral audio computing system.

FIG. 7 is a flowchart showing a method performed by the peripheral audio computing system. The method can include establishing a connection with an audio source within a first network, the first network including the audio source, the peripheral audio computing system, and a central audio computing system (702). The method can include establishing a connection with the central audio computing system within a second network, the second network including the peripheral audio computing system and the central audio computing system, the central audio computing system functioning as a central node in the second network (704). The method can include receiving, from the audio source via the connection within the first network, an audio packet, the audio packet including audio data (706). The method can include sending, to the central audio computing system, a receipt time, the receipt time indicating when the peripheral audio computing system received the audio packet (708). The method can include receiving, from the central audio computing system, a rendering time (710). The method can include outputting, at a time based on the rendering time, audio based on the audio data (712).

In some examples, the second network does not include the audio source.

In some examples, the method further includes determining a connection interval number of the audio packet, and the sending the receipt time includes sending, to the central audio computing system, the receipt time and the connection interval number.

In some examples, the audio packet includes the audio data and a sequence number identifying the audio data, and the sending the receipt comprises sending the receipt time and the sequence number.

In some examples, the audio source is a central node of the first network.

Figure 8:
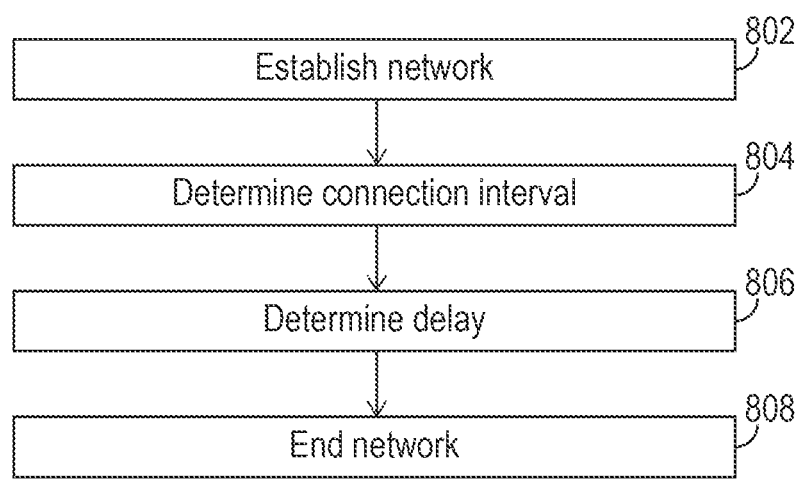
FIG. 8 is a flowchart showing a method performed by the central audio computing system.

FIG. 8 is a flowchart showing a method performed by the central audio computing system 102A. The method can include establishing a network 108 (802). The central audio computing system 102A can establish the second network 108 (802) after the audio source 104 has established the first network 106. The central audio computing system 102A can establish the second network (802) as discussed above with respect to (304). The central audio computing system 102A can determine a connection interval (804) of the second network 108. The central audio computing system 102A can determine a connection interval (804) of the second network 108 by first determining a connection interval of the first network 106, and determining the connection interval of the second network 108 as an integer multiple, greater than one, of the connection interval of the first network 106. The central audio computing system 102A can determine a delay to render and/or process the audio packets, such as the delay 320, 322, 550A, 550B, 551A, 551B discussed above. After determining the delay (806), the central audio computing system 102A can end and/or disconnect the network 108 (808).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a Bluetooth Low Energy (BLE) network, a local area network (LAN), and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a first audio computing system to:
   establish a connection with an audio source within a first network, the first network including the audio source, the first audio computing system, and a second audio computing system, the audio source being a master device of the first network;
   establish a connection with the second audio computing system within a second network, the second network including the first audio computing system and the second audio computing system, the first audio computing system being a master device of the second network;
   receive, from the audio source via the connection within the first network, a first audio packet, the first audio packet including audio data;
   capture a first connection interval number of the first audio packet;
   receive, from the second audio computing system, a receipt time and a second connection interval number of a second audio packet, the receipt time indicating when the second audio computing system received, from the audio source within the first network, the second audio packet, the second audio packet including the audio data included in the first audio packet;
   calculate a rendering time based on a time of receiving the first audio packet, the receipt time, the first connection interval number, and the second connection interval number;
   send the rendering time to the second audio computing system via the second network; and
   output audio based on the audio data.

2. The non-transitory computer-readable storage medium of claim 1, wherein the second network does not include the audio source.

3. The non-transitory computer-readable storage medium of claim 1, wherein the calculating the rendering time comprises calculating the rendering time based on the time of receiving the first audio packet, the receipt time, the first connection interval number, the second connection interval number, and a connection interval time.

4. The non-transitory computer-readable storage medium of claim 1, wherein:
   the first audio packet includes the audio data and a sequence number identifying the audio data; and the receiving the receipt time comprises receiving, from the second audio computing system, the receipt time and the sequence number.

5. The non-transitory computer-readable storage medium of claim 1, wherein:
the rendering time comprises a second audio computing system rendering time;
the instructions are further configured to cause the first audio computing system to calculate a first audio computing system rendering time based on the time of receiving the first audio packet; and
the outputting audio based on the audio data comprises outputting the audio based on the audio data at the first audio computing system rendering time.

6. The non-transitory computer-readable storage medium of claim 1, wherein the first audio computing system is a central node of the second network.

7. The non-transitory computer-readable storage medium of claim 1, wherein the instructions are further configured to cause the first audio computing system to establish a connection interval of the second network to a multiple of a connection interval of the first network.

8. The non-transitory computer-readable storage medium of claim 1, wherein:
the rendering time comprises a second audio computing system rendering time;
the instructions are further configured to cause the first audio computing system to calculate a first audio computing system rendering time based on the time of receiving the first audio packet;
the outputting audio based on the audio data comprises outputting the audio based on the audio data at the first audio computing system rendering time;
the instructions are further configured to cause the first audio computing system to change a connection interval of the second network to a multiple of a connection interval of the first network;
the instructions are further configured to cause the first audio computing system to recalculate the first audio computing system rendering time based on a difference between an anchor point of the first audio computing system in the second network and an anchor point of the first audio computing system in the first network; and
the instructions are further configured to cause the first audio computing system to recalculate the second audio computing system rendering time based on a difference between an anchor point of the second audio computing system in the second network and an anchor point of the second audio computing system in the first network.

9. The non-transitory computer-readable storage medium of claim 8, wherein the instructions are further configured to cause the first audio computing system to send the recalculated second rendering time to the second audio computing system.

10. The non-transitory computer-readable storage medium of claim 9, wherein the instructions are further configured to cause the first audio computing system to end the second network after sending the recalculated second rendering time to the second audio computing system.

11. An apparatus comprising:
at least one processor; and
a non-transitory computer-readable storage medium comprising instructions stored thereon that, when executed by the at least one processor, are configured to cause a first audio computing system to:
establish a connection with an audio source within a first network, the first network including the audio source, the first audio computing system, and a second audio computing system, the audio source being a master device of the first network;
establish a connection with the second audio computing system within a second network, the second network including the first audio computing system and the second audio computing system, the first audio computing system being a master device of the second network;
receive, from the audio source via the connection within the first network, a first audio packet, the first audio packet including audio data;
receive, from the second audio computing system, a receipt time, the receipt time indicating when the second audio computing system received, from the audio source within the first network, a second audio packet, the second audio packet including the audio data included in the first audio packet;
calculate a rendering time based on a time of receiving the first audio packet and the receipt time;
recalculate the rendering time based on a difference between an anchor point of the second audio computing system in the second network and an anchor point of the second audio computing system in the first network;
send the recalculated rendering time to the second audio computing system via the second network; and
output audio based on the audio data.

12. The apparatus of claim 11, wherein the second network does not include the audio source.

13. A non-transitory computer-readable storage medium comprising instructions stored thereon that, when executed by at least one processor, are configured to cause a first audio computing system to:
establish a connection with an audio source within a first network, the first network including the audio source, the first audio computing system, and a second audio computing system, the audio source being a master device of the first network;
establish a connection with the second audio computing system within a second network, the second network including the first audio computing system and the second audio computing system, the first audio computing system being a master device of the second network;
receive, from the audio source via the connection within the first network, a first audio packet, the first audio packet including audio data;
receive, from the second audio computing system, a receipt time, the receipt time indicating when the second audio computing system received, from the audio source within the first network, a second audio packet, the second audio packet including the audio data included in the first audio packet;
calculate a rendering time based on a time of receiving the first audio packet and the receipt time;
recalculate the rendering time based on a difference between an anchor point of the second audio computing system in the second network and an anchor point of the second audio computing system in the first network;
send the rendering time to the second audio computing system via the second network; and
output audio based on the audio data.

* * * * *